Dec. 3, 1968  L. E. GOODWIN ET AL  3,413,915
MAGNETICALLY BIASED PRESSURE APPLICATION
TO RUNNING LENGTH MATERIALS
Filed June 10, 1965  11 Sheets-Sheet 1

INVENTORS
LESLIE E. GOODWIN
J. MAX ROWE
NATHANIEL C. WYETH

BY  Harry J. McCauley
ATTORNEY

INVENTORS
LESLIE E. GOODWIN
J. MAX ROWE
NATHANIEL C. WYETH

BY Harry J. McCauley

ATTORNEY

INVENTORS
LESLIE E. GOODWIN
J. MAX ROWE
NATHANIEL C. WYETH

BY Harry J. McCauley

ATTORNEY

L. E. GOODWIN ET AL 3,413,915

MAGNETICALLY BIASED PRESSURE APPLICATION
TO RUNNING LENGTH MATERIALS

Filed June 10, 1965

INVENTORS
LESLIE E. GOODWIN
J. MAX ROWE
NATHANIEL C. WYETH

BY Harry J. McCauley

ATTORNEY

Dec. 3, 1968    L. E. GOODWIN ET AL    3,413,915
MAGNETICALLY BIASED PRESSURE APPLICATION
TO RUNNING LENGTH MATERIALS
Filed June 10, 1965    11 Sheets-Sheet 9

INVENTORS
LESLIE E. GOODWIN
J. MAX ROWE
NATHANIEL C. WYETH

BY Harry J. McCauley

ATTORNEY

Dec. 3, 1968  L. E. GOODWIN ET AL  3,413,915
MAGNETICALLY BIASED PRESSURE APPLICATION
TO RUNNING LENGTH MATERIALS
Filed June 10, 1965  11 Sheets-Sheet 10

INVENTORS
LESLIE E. GOODWIN
J. MAX ROWE
NATHANIEL C. WYETH

BY  *Harry J. McCauley*

ATTORNEY

Dec. 3, 1968      L. E. GOODWIN ET AL      3,413,915
MAGNETICALLY BIASED PRESSURE APPLICATION
TO RUNNING LENGTH MATERIALS
Filed June 10, 1965                              11 Sheets-Sheet 11

INVENTORS
LESLIE E. GOODWIN
J. MAX ROWE
NATHANIEL C. WYETH

BY

ATTORNEY

United States Patent Office 3,413,915
Patented Dec. 3, 1968

3,413,915
MAGNETICALLY BIASED PRESSURE APPLICATION TO RUNNING LENGTH MATERIALS
Leslie Ethel Goodwin and Jean Max Rowe, Wilmington, Del., and Nathaniel Convers Wyeth, Rosedale, Pa., assignors to E. I. du Pont de Nemours and Company, Wilmington, Del., a corporation of Delaware
Filed June 10, 1965, Ser. No. 462,961
10 Claims. (Cl. 100—169)

ABSTRACT OF THE DISCLOSURE

A pair of cooperating magnetically biased pressure applicators mounted for free movement with respect to one another, one of which is a roll supported by a coaxial shaft journaled at the ends to permit roll rotation, defining between them a material-receiving nip, and a method for loading the applicators.

This invention relates to magnetically-biased, pressure applying apparatus for running length materials such as yarn, strands, sheets or webs and the like, and particularly to apparatus incorporating a pair of relatively movable ferromagnetic pressure applicators, at least one of which is a roll journaled for rotation about its longitudinal axis which, between them, define a magnetically variable clearance nip or bite through which passes the running length material.

In many applications it is essential that uniform pressures be applied over the full width of the apparatus treating and handling running length materials, and this has hitherto proved very difficult of accomplishment. Thus, in calender-type roll sets used in the paper, textile and rubber industries for calendering, bonding, laminating, embossing and the like it has been difficult to obtain uniform pressure application lengthwise of the rolls, due to the central transverse deflection occurring in rolls of even moderate lengths, as opposed to the rigidly constrained ends, and other causes. In some instances crowning the rolls, or stiffening them against undesired deflections by the utilization of back-up rolls, has been helpful, but the problem has not hitherto been satisfactorily solved.

It is an object of this invention to provide a magnetically-biased pressure-applying apparatus for running length materials such as yarn, strands, sheets or webs, which is adapted to apply a highly uniform compressional loading on materials passed therethrough. Other objects of this invention are the provision of a pressure-applying apparatus low in first cost and maintenance, an apparatus compact in size and one adapted to precise regulability of compressional force application. The manner in which these and other objects of this invention are attained will become clear from the detailed description and the following drawings, in which:

FIG. 11, FIGS. 14A and 14B are, respectively, left-hand and right-hand split longitudinal sections taken on line 14—14, FIG. 12.

Generally, this invention comprises a magnetically-biased, pressure-applying apparatus for running length materials comprising, in combination, a pair of ferromagnetic pressure applicators, at least one of which is a roll journaled for rotation about its longitudinal axis, defining between them a material-receiving nip generally parallel to the longitudinal axis of the roll, the applicators being mounted for free movement with respect to one another in a direction varying the opening of the nip, and means developing a substantially uniform magnetic flux density through the applicators in the plane of the roll longitudinal axis and the nip urging the applicators together, and also a method for magnetic biasing.

The following terms are employed consistently in this description and in the claims according to the given definitions. "Magnetically-biased" is intended to encompass permanent magnetic biasing, electromagnetic biasing, and all combinations of both. "Roll" includes both cylindrical and tapered varieties. The mounting of applicators "for free movement with respect to one another in a direction varying the opening of the nip" defined by the applicators is intended to encompass all applicator mountings such that nip clearance is variable, including, specifically, those in which only one applicator of the pair is movable with respect to the other and also designs in which both applicators are movable generally towards or away from each other.

Figure 1:
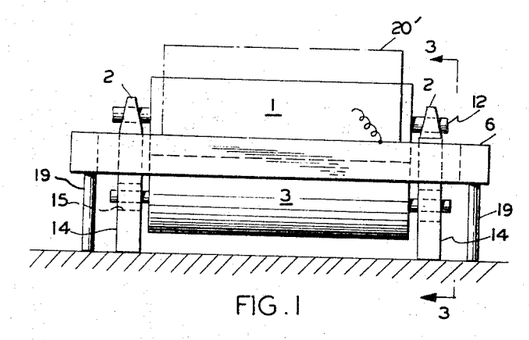
FIG. 1 is a side-elevational view of a first embodiment of apparatus according to this invention incorporating a parallel roll set biased electromagnetically by a single symmetrically mounted electrical coil.
Figure 2:
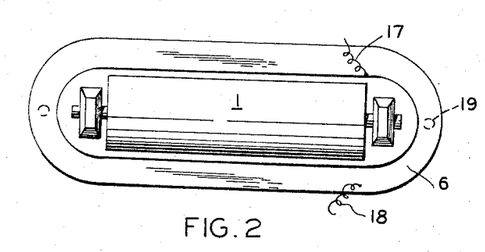
FIG. 2 is a plan view of the apparatus of FIG. 1.
Figure 3:
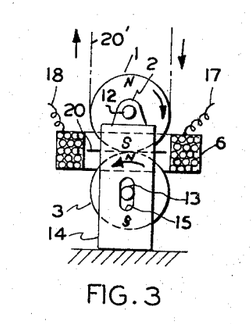
FIG. 3 is a sectional end view taken on line 3—3, FIG. 1.

Referring to FIGS. 1–3, inclusive, the first embodiment of this invention comprises a design utilizing a pair of axially parallel ferromagnetic (e.g., low carbon steel) cylindrical rolls 1 and 3 disposed in a common vertical plane defining between them a product-receiving nip, the product in this instance being represented schematically at 20' as a running sheet or web entering from the top at the right-hand side as seen in FIG. 3 and leaving on the top left-hand side after wrapping upper roll 1 for approximately 180° of the roll circumference.

The rolls in this instance have their axes in horizontal planes, upper roll 1 being keyed or otherwise attached to its supporting shaft 12 journaled at opposite ends in fixed bearings 2 mounted on the top ends of pedestal supports 14. Roll 3 is provided with an integral concentric shaft 13, the ends of which are guided within slots 15 (preferably through the agency of slidably guided journal boxes, not detailed), so that roll 3 is free to move vertically under the magnetic bias hereinafter described, so that rolls 1 and 3 are urged together and, at the upper limit of slots 15, actually come into tangential contact, thereby compressing any product running through the nip or bite formed by the roll pair.

The magnetic bias for this first embodiment is provided by electrical coil 6 which is symmetrically mounted on end posts 19 so as to enclose the apparatus in close adjacency over its entire periphery, with the longitudinal center line of the coil coincident with the horizontal plane 20 passing through the roll nip. Leads 17 and 18, running to any suitable source of direct current, create a magnetic field surrounding the coil, the magnetic circuit of which is completed through the ferromagnetic rolls 1 and 3, thereby biasing the rolls firmly together. It will be understood that the confronting surfaces of rolls 1 and 3 thus have opposite polarities over the full roll lengths, the specific existing polarities being determined by the nature of the coil windings and the direction of electric current flow through the coil. Assuming a conventional helical coil winding of successive layers of conductor gradually laid on until full coil thickness is achieved, the development as regards the oblong coil form 6 can be conveniently referred to the two center axes 43 and 44, FIG. 23, the coil end portions being formed along circular arc lines drawn from these as centers. In the construction detailed, axes 43 and 44 are in a plane parallel with the plane inclusive of the axes of rolls 1 and 3 and the roll nip, but perpendicular to these axes. It will be noted from FIG. 2 particularly that the straight length expanse of coil 6 runs full length of rolls 1 and 3, and this is an important feature of the design as regards obtainment of uniform magnetic loading throughout the entire roll lengths.

A conventional center drive (e.g. Hooke's or Cardon's couplings, provided with central splines for lengthwise accommodation), not detailed, is preferably employed to power-rotate the rolls; however, particularly in small-sized equipment, the web in process, if sufficiently strong to withstand the tensions required, can simply be dragged through the nip.

In any case, the web is most conveniently threaded through the roll nip before the D-C power is applied to coil 6, after which roll 3 is attracted upwardly by the magnetic bias with a force which varies inversely with the nip clearance. It is sometimes advantageous to provide hydraulic end lifts or the like applicable to the ends of shaft 13 to raise the lower roll initially until the magnetic attractive forces strongly overcome the gravitational forces acting on the mass of roll 3 and, of course, a wide variation in design of auxiliary features such as these will readily occur to persons skilled in the art as the particular conditions and requirements of application dictate. A very high uniformity in terms of pounds of loading per lineal inch of roll-to-roll confrontation is obtainable, the design of FIGS. 1–3 easily producing 5 lbs./lineal inch of compressive loading at a roll-to-roll separation of 0.01" for an apparatus having rolls 3" dia. x 25" long, a coil 6 of 125 turns of 0.1" dia. insulated copper wire and an electrical current supplied at 40 amps.

Figure 3A:
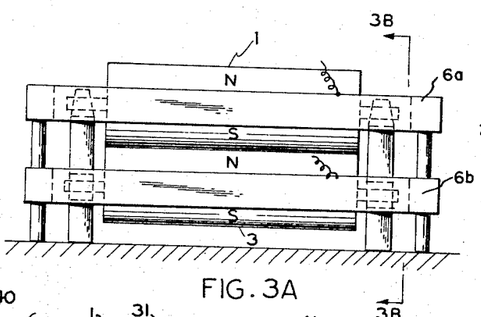
FIG. 3A is a side-elevational view of a second embodiment of apparatus according to this invention similar to the embodiment of FIGS. 1–3, but utilizing a pair of electromagnetically biasing coils, one for each of the rolls.
Figure 3B:
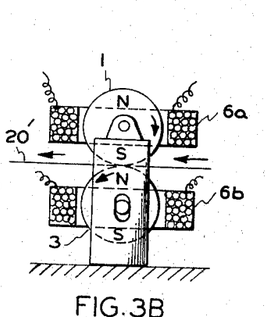
FIG. 3B is a sectional end view taken on line 3B—3B of FIG. 3A.

It will be understood that it is practicable to operate with straight-through feed of product in plane 20, provided that coil 6 is canted sufficiently so that the web clears the coil edges in its transit through the roll nip. Tests reveal that the coil can be rotated about its longitudinal axis to an angle of approximately 20° with respect to the roll axes-nip plane without perceptible change in measured flux density. Of course, further canting, up to about 45°, is practicable, but with progressive reduction in flux density. From all considerations, it is therefore preferred to design for ample clearance along plane 20 by a construction such as that shown in FIGS. 3A and 3B.

Here the identical roll pair arrangement 1, 3 of FIGS. 1-3 is preserved; however, individual electrical coils 6a and 6b are now employed, each symmetrically mounted parallel one to another in horizontal planes passing through the roll axes, a typical magnetic pole development being denoted in the usual N–S convention for the design detailed. It will be understood, of course, that the current directions and winding patterns of the two coils must be preselected for effectuation of an appropriate direction of magnetization in each, so that the overall magnetic biasing produced is attractive. If the same coil size is utilized for each of the coils of this embodiment as for the first embodiment, the number of turns is obviously doubled, with a considerable enhancement in the magnetic biasing obtained. Thus, in a test installation employing rolls 1 and 3 of 3″ dia. x 25″ long, coils 6a and 6b each 125 turns of 0.1″ dia. insulated copper wire, connected in series, and with a current supply of 40 amperes, a loading force of about 18 lbs./lineal inch of nip was obtained at a roll-to-roll separation of about 0.010″.

Figure 4:
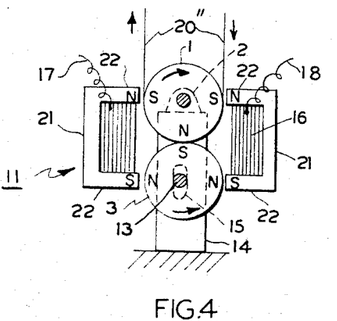
FIG. 4 is an end elevational section view taken inwards of the right-hand pedestal of a third embodiment of apparatus according to this invention incorporating a parallel roll set biased electromagnetically by a single symmetrically mounted electrical coil provided with ferromagnetic flux guides for conservation of magnetic energy.

A third embodiment of apparatus according to this invention is that shown in FIG. 4, as to which the roll construction, supports and the like is identical with that of the embodiment of FIGS. 1-3 and FIGS. 3A and 3B, respectively, so that the same reference characters are employed in component designation. However, there is here utilized a different type of coil 16 which, in this instance, is of the same shape in plan as coils 42 of FIG. 23 and 6 of FIG. 2 but comprises 250 turns of flat copper strip (typically, 0.005″ thick x 2″ wide) insulated electrically one from another by a continuous interleaved layer of thin (0.001″) polyester film. Again coil 15 encircles the entire apparatus, with straight lengths generally co-extensive with the roll lengths. The coil is emplaced within identical opposed channel-like flux guides fabricated from ferromagnetic steel plate, as to which the center members 21 measured 0.5″ thick x 3.5″ high x 25″ long, arranged co-extensive in length with the lengths of rolls 1 and 3, whereas legs 22 were 0.5″ thick x 2.0″ wide x 25″ long with ends symmetrically opposite one another at the horizontal diameters of rolls 1 and 3 and at a clearance therefrom of approximately 0.03″. The marked advantage of flux guide incorporation is demonstrated by the fact that roll loadings of about 135 lbs./lineal inch were achieved at roll separations of 0.010″ with an electric current supply of only 30 amperes. The reason for this is that the high permeability of the flux guide material substantially reduces the total reluctance of the magnetic path and therefore greatly increases the flux density for a given coil size in ampere-turns thereby increasing the attractive force markedly.

Since the construction of FIG. 4 closes off entirely side access to the roll set, the running web 20″ must be fed in from the top with 180° wrap reversal of course to exit, in the same manner as hereinbefore described for the first embodiment shown in FIGS. 1-3.

Figure 5:
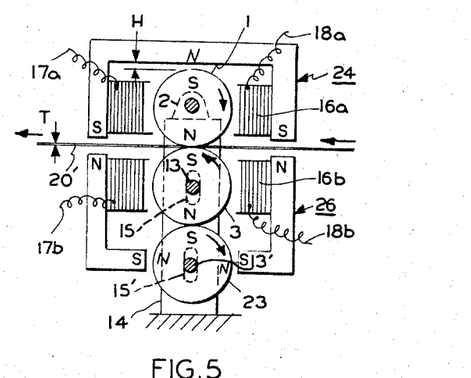
FIG. 5 is an end elevational section view taken inwards of the right-hand pedestal of a fourth embodiment of apparatus according to this invention consisting of a parallel three-high roll stack design biased electromagnetically by a pair of electrical coils, individual ones of which bias individual rolls acting on the product in manufacture, and the third roll of which constitutes a component in the ferro-magnetic flux guide path.

The embodiment of FIG. 5 was devised to permit straight-through feed of the web 20′ and comprises the ferromagnetic two-roll stack 1 and 3 mounted on pedestals 14 identical with that hereinbefore described to which, however, has been added a third ferromagnetic roll 23 provided with an integral shaft 13′ slidably journaled within slot 15′ for free movement in a vertical plane in identical manner as described for roll 3 in the first embodiment of FIGS. 1-3. In this construction the arrangement of flux guides is modified, so that the upper guide 24 consists of an inverted ferromagnetic channel co-extensive in length disposition with respect to rolls 1, 3 and 23. Similarly, the lower guide 26 is, in effect, two opposed L-sections which, together with roll 23, function collectively as a flux guide complementing flux guide 24. Individual coils 16a and 16b service individual rolls 1 and 3, respectively, and are of identical design with coil 16, FIG. 4, already described, the upper coil 16a being emplaced within flux guide 24, whereas the lower coil, 16b, is emplaced within the split L-sections of flux guide 26. One operative magnetic pole orientation, is denoted in the accepted convention.

Typical dimensions for the design detailed are as follows:

Rolls 1, 3 and 23 were 3″ dia. x 25″ long.

Coils 16a and 16b were each 250 turns of copper strip 0.005″ thick x 2″ wide insulated turn for turn with 0.001″ polyester film.

Flux guide 24 was 1″ thick x 4″ high x 9.5″ wide x 36″ long. (The given length is not critical, except that it should equal the roll length, and was chosen as a matter of convenience in this instance to effect end attachment of the flux guides to the roll support structure.)

Clearance H between upper roll 1 and the inner surface of flux guide 24 was 0.12″.

Flux guide 26 was fabricated as a single piece identical with flux guide 24, but then sawed lengthwise to leave full-length lower gap 3.06″ wide for the reception of flux guide roll 23 with clearance from roll 23 to opposed leg portions of flux guide 26 of 0.03″ each.

Clearance between opposed ends of the legs of flux guides 24 and 26 was 0.25″.

In a test conducted with a current supply of 25 amps. to each of the coils 16a and 16b, the measured loading between rolls 1 and 3 was about 235 lbs./lineal inch of nip length for a roll separation of 0.010″.

With the embodiment of FIG. 5, it is essential that clearance H be large as compared with the nip clearance T, i.e., the compressed thickness of web 20′, and, preferably, a minimum of ten times greater. The reason for this is that, under coil energization, a magnetic attraction exists between upper roll 1 and the horizontal cross-piece of flux guide 24 which can be sufficient to cause some upward bowing of either or both of the rolls 1 and 3. It is practicable to curve the horizontal cross-piece of flux guide 24 slightly away from the upper periphery of roll 1, thereby increasing the effective gap H; however, this results in some increase in the reluctance of the upper flux path and, thus, must be resorted to with restraint.

Figure 6:
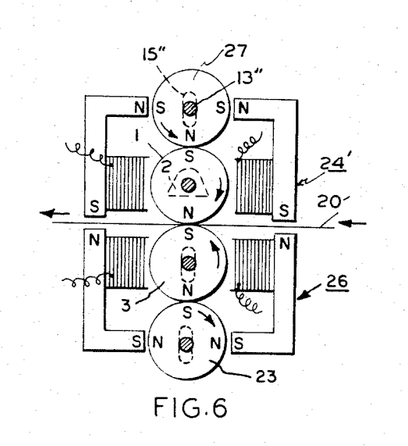
FIG. 6 is an end elevational section view taken inwards of the right-hand pedestal of a fifth embodiment of apparatus according to this invention consisting of a parallel four-high roll stack design, wherein the electromagnetic biasing is by a pair of electrical coils mounted symmetrically about individual ones of the central pair of rolls and the outside rolls function as flux guides.

The problem of counteracting magnetic attraction is overcome by the embodiment of FIG. 6, wherein completely symmetrical top and bottom flux guide constructions are utilized through the addition of a fourth roll 27, overlying roll 1 and in tangential contact therewith, interposed within a gap in upper flux guide 24′ in the identical relationship taught for roll 23 within the split lower flux guide 26. Roll 27 is integral with concentric shaft 13″ journaled in slots 15″ in the support pedestals (not shown), so as to be of the same construction as hereinbefore described for roll 23. Typical pole orientations are shown for one operative apparatus according to FIG. 6.

Figure 7:
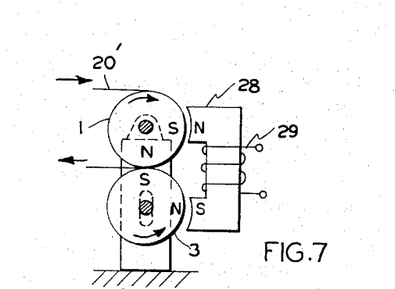
FIG. 7 is an end elevational section view taken inwards of the right-hand pedestal of a sixth embodiment of apparatus acocrding to this invention incorporating a two roll set electromagnetically biased together by a single coil mounted to one side of the rolls and provided with a single ferromagnetic flux guide.

Referring to FIG. 7, there is shown a design wherein access to the roll pair is obstructed only on one side; in this embodiment the necessity for having the coil encircle the entire apparatus is eliminated. Here a single channel form flux guide 28 is utilized with the magnetizing coil 29 wrapped around the guide as a core, the ends of the guide being machined to an arcuate profile matching the peripheries of rolls 1 and 3, as to which the guide ends are disposed symmetrically with respect to the horizontal diameters. Typical polarities are denoted for such an apparatus, and the web 20′ in treatment is shown as entering from the top left and leaving toward the bottom left, after a 180° reversal in course by wrap around roll 1. This embodiment has the disadvantage that there is an unbalanced force urging the rolls to the right; however, where open access is at a premium, this may be tolerated.

Figure 8:
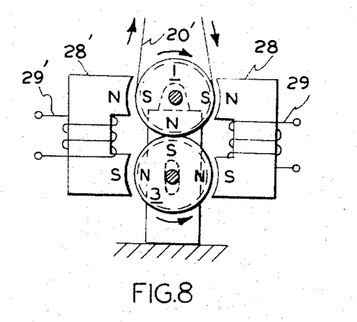
FIG. 8 is an end elevational section view taken inwards of the right-hand pedestal of a seventh embodiment of apparatus according to this invention similar to the sixth embodiment shown in FIG. 7, but incorporating a pair of oppositely disposed coils and flux guides.

The embodiment of FIG. 8 cures the unbalanced forces present in the design of FIG. 7 by providing identical flux guides 28 and 28' symmetrically disposed on opposite sides of the two rolls, each constituting a core for the individual magnetizing coils 29 and 29'. In a typical apparatus of FIG. 8 design as well as in a test apparatus constructed according to FIGS. 9 and 10, identical hollow rolls of diameter 8", length 12" and wall thickness 1.5" were utilized, whereas the flux guides had a height of 10", length of 12", thickness of 2" and width (i.e., length of legs directed toward the rolls) of 8¾". Coils 29 and 29' comprised 800 turns of 0.1" dia. insulated copper wire and the pole-to-roll gaps were 0.330". With an energizing coil current of 45 amps. D–C, the measured roll-to-roll attractive force was 292 lbs./lineal inch of nip at a nip clearance of 0.010". Feed of web 20' was, in this instance, from the top.

Figure 9:
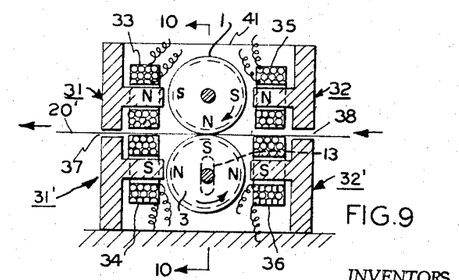
FIG. 9 is an end elevational section view taken inwards of the right-hand pedestal of an eighth embodiment of apparatus according to this invention incorporating a two roll set electromagnetically biased together by individual opposed pairs of coils wound on cores constituting integral parts of common ferromagnetic flux guides.
Figure 10:
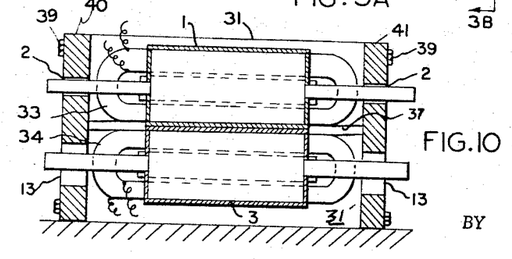
FIG. 10 is a side-elevational sectional view of the entire apparatus of FIG. 9, taken on line 10—10 thereof.

Referring to FIGS. 9 and 10, there is depicted another embodiment of the invention eliminating the necessity for coil encirclement of the entire apparatus, this being a two-roll design in which each roll is serviced by a pair of coils wound on ferromagnetic flux-guide cores symmetrically arranged along the horizontal diameters of the rolls.

Thus, ferromagnetic flux guides 31, 32, 31' and 32' are approximately T-shaped in cross-section with pairs of legs directed toward their associated rolls with a clearance therebetween of 0.062" for roll 1 and 0.032" for roll 3, a greater allowance being made at the top to permit easy feed of a web in process from the top side of the apparatus should this ever become necessary, although the actual web 20' feed shown is of the straight-through horizontal type.

The flux guides in a typical apparatus were fabricated from low carbon steel 2" thick throughout, with 12.2" long legs directed toward rolls 1 and 3 measuring 6¾" from the T-cross-bars, which latter were 2" thick and 22" long, so that the T-cross-bars extended approximately 5" beyond each roll end. The straight run lengths of coils 33, 34, 35 and 36 thus extended approximately 1.5" outwards of the roll ends, as shown in FIG. 10. The flux guides were independently supported by attachment via bolts 39 to non-ferromagnetic end plates 40 and 41, leaving 0.250" slots 37 and 38 aligned with the nip between opposed end portions for free transit of web 20' through the apparatus. End plates 40 and 41 can conveniently replace the support pedestals 14 of previously described embodiments, and are thus provided with fixed bearings 2 for the top roll and bearing slots 13 for the bottom roll, as indicated in FIG. 10.

In the construction detailed, wherein coils 33, 34, 35 and 36 were series-connected and each comprised 400 turns of 0.1" dia. insulated copper wire wound with reference to one another to obtain additive magnetizations, as denoted by the polarities given in FIG. 9, an energizing current of 30 amps. was effective to produce a loading of 450 lbs./linear inch of nip length at a roll-to-roll separation of 0.042".

Turning now to FIGS. 11–18, there is detailed a preferred embodiment of apparatus which is described in conjunction with a number of auxiliary features contributing to operation, including regulable nip compression, ease of thread-up and disassembly for repair, and provision for optional roll heating or cooling, as desired.

Figure 11:
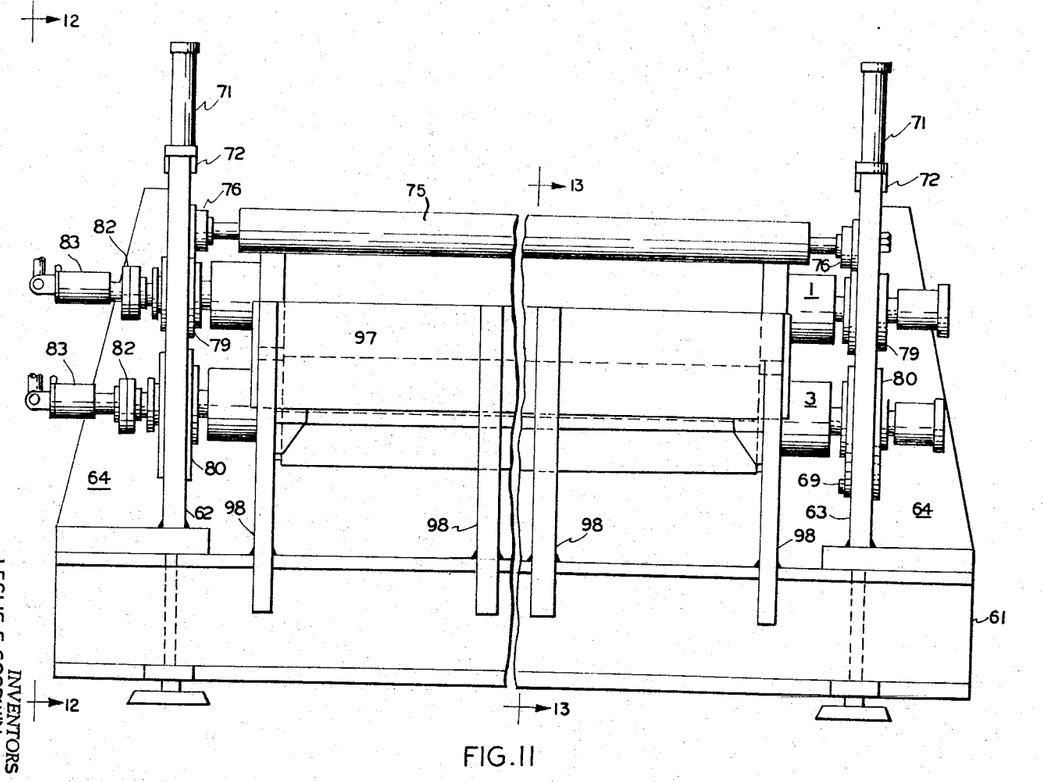
FIG. 11 is a side elevation view of a preferred embodiment of two-roll apparatus according to this invention.
Figure 12:
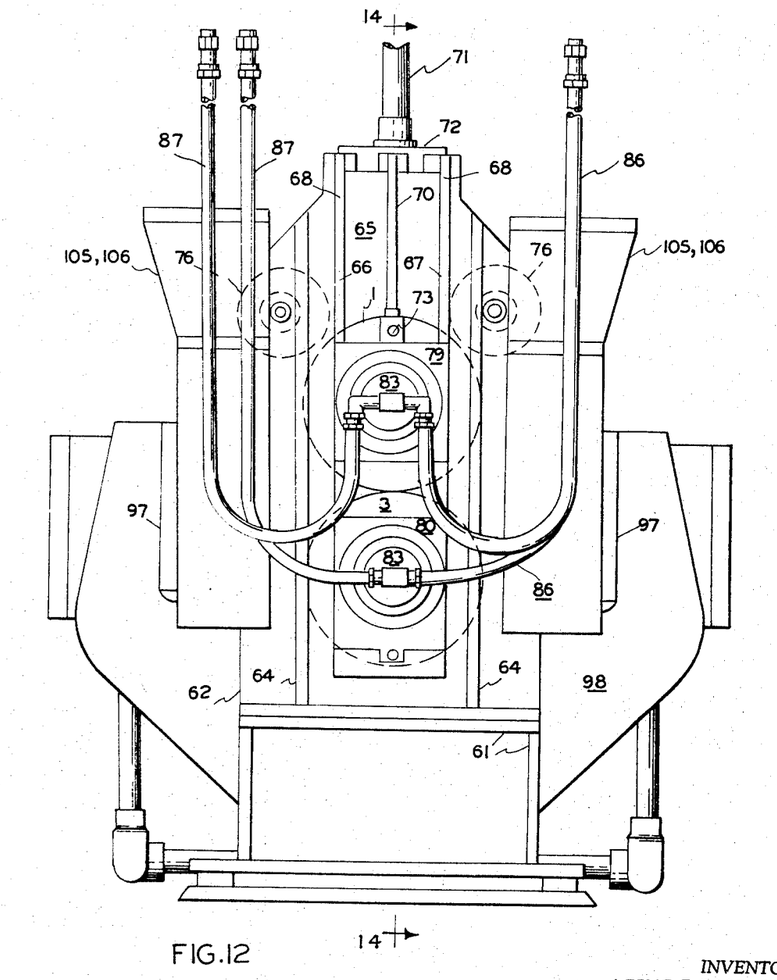
FIG. 12 is an end elevational view taken on line 12—12, FIG. 11.
Figure 13:
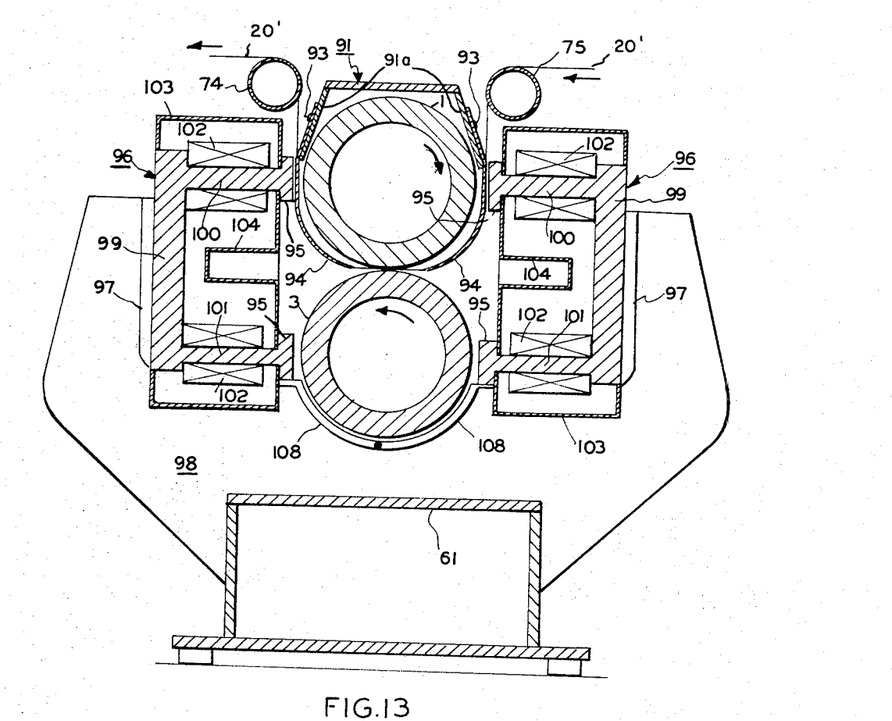
FIG. 13 is a transverse sectional view taken on line 13—13.

The base of the apparatus can conveniently comprise a horizontal floor-mounted channel 61, which is a weldment fabricated from ferromagnetic plates. Bolted to channel 61 at opposite ends are support pedestals 62 and 63, braced by webs 64, which support the ferromagnetic pair of pressure applicator rolls 1 and 3 journaled in pillow block pairs 79 and 80, respectively. The pedestals are cut away lengthwise from the top end to nearly the bottom to provide vertical slots 65 open at the top and machined along the inner edges 66 and 67, and also along the outboard surfaces 68, to form planar ways for the reception of the pairs of upper and lower pillow blocks 79 and 80, respectively, which are grooved along their vertical edges to slide snugly over the pedestal ways. Lower pillow blocks 80 are grooved on their undersides and fit over tongues 62' and 63' constituting the lower boundaries of the slots 65 in the pedestals 62 and 63, respectively, being secured thereto by removable pins 69. Each of the upper pillow blocks 79 is attached at the top to the lower end of a piston rod 70 of a vertically disposed hydraulic lifting cylinder 71 by means of a removable pin 73. Cylinders 71 are supported upon brackets 72, which bridge the upper open ends of slots 65 and are screw-attached to the uppermost ends of pedestals 62 and 63.

As best seen in FIGS. 12 and 13, the apparatus is provided with small-diameter tubular guide rollers 74 and 75 fabricated from non-ferromagnetic material, which are journaled in stationary bearings 76 mounted on the inner faces of pedestals 62 and 63 at the same horizontal level somewhat below the upper ends of slots 65. As shown in FIG. 11, the right-hand ends of the shafts of guide rolls 74 and 75 extend through pedestal 63 and can thence be coupled to power drive means not shown. In normal operating position, rollers 74 and 75 thus lie to either side of upper roll 1, with upper peripheral boundaries disposed slightly above the upper periphery thereof, all as shown in FIG. 13. Thus, upon concurrent actuation of both hydraulic lifts 71, the assembly consisting of pillow blocks 79 and roll 1 journaled therein will be lifted to the upper end of slot 65, leaving an unobstructed passage below roll 1 and above rolls 74 and 75 for the ready thread-up of the web to be processed.

Figure 14A:
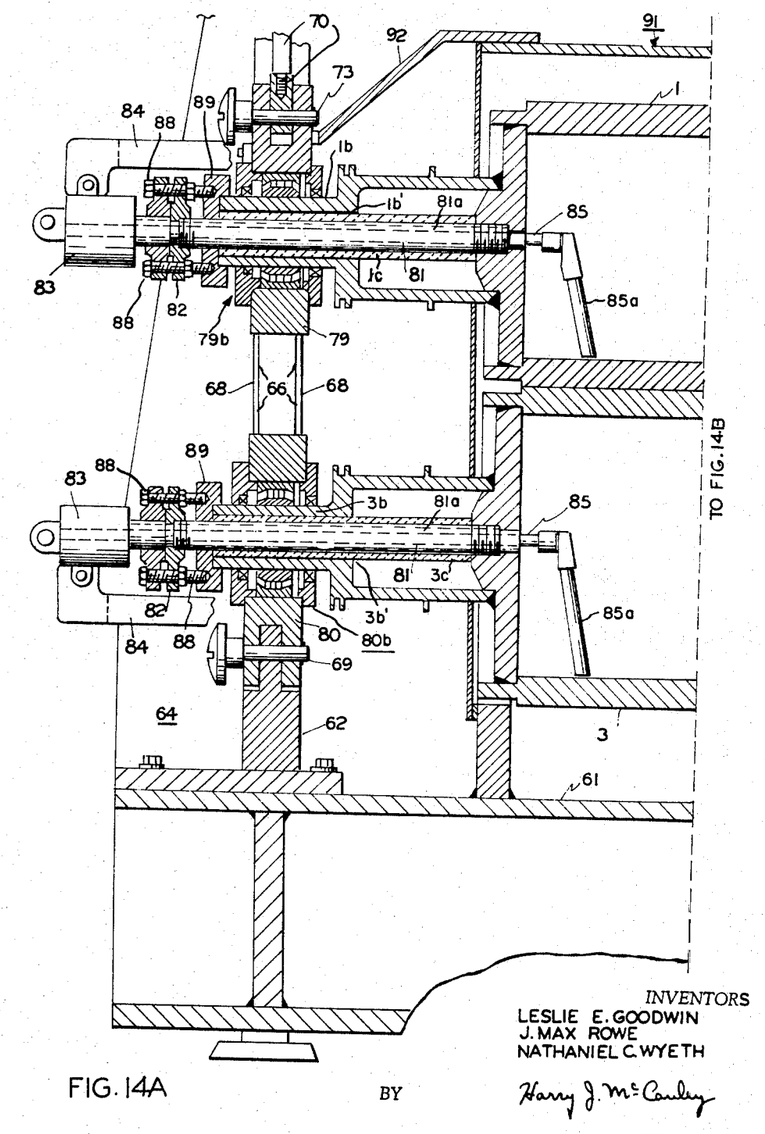
Figure 14B:
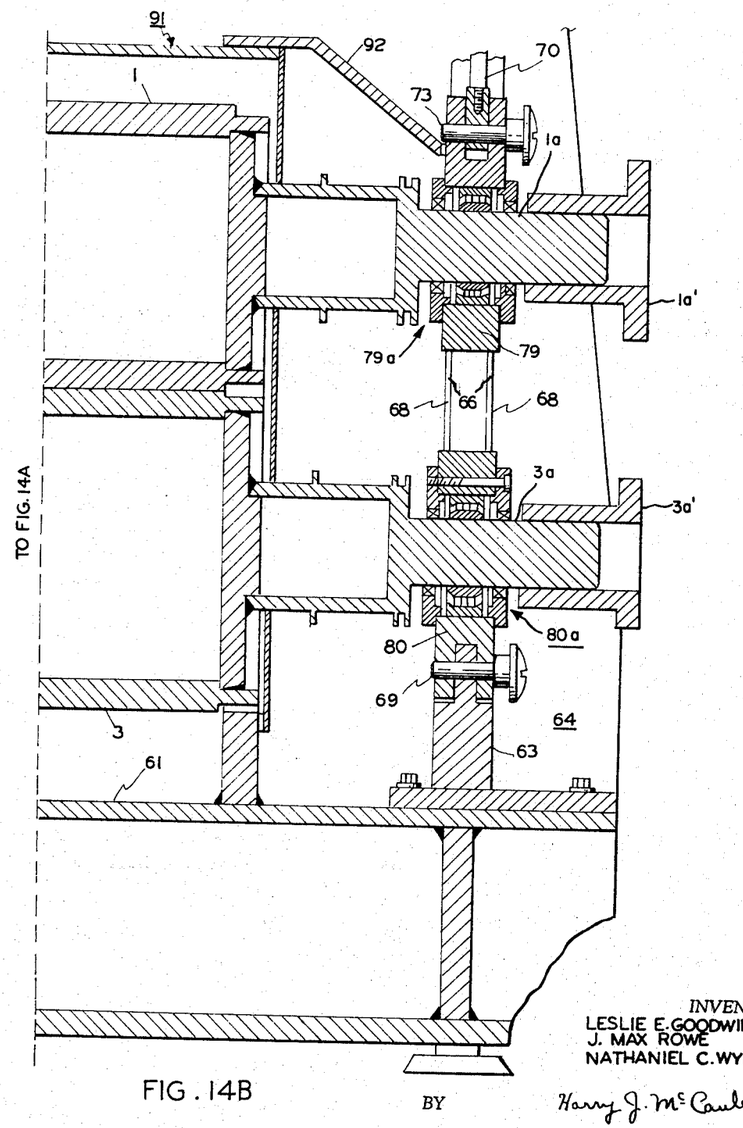

The details of roll 1, 3 construction are particularly shown in FIGS. 14A and 14B. The rolls are thick-walled tubes, closed off at the right-hand ends by welded covers, to which are secured the projecting shafts 1a and 3a journaled in conventional roller bearings 79a and 80a carried by right-hand pillow blocks 79 and 80, respectively. These shafts extend outboard of the bearings (refer FIG. 14B) and carry couplings 1a' and 3a' for connection of the shafts to a power drive, not shown.

The left-hand ends of the rolls are similarly closed off by means of welded covers provided at the outboard ends with projecting shafts 1b and 3b journaled in roller bearings 79b and 80b carried by left-hand pillow blocks 79 and 80, respectively, both the covers and shafts being drilled axially at 1b' and 3b' as shown. Rolls 1 and 3 are designed in conventional manner for removal of condensate through centrifugal collection along the inside roll periphery, with scoop withdrawal via nozzles 85a supported by connection at their upper ends through hinge joints to stationary horizontal pipe lengths 85 mounted concentrically within larger diameter pipe secitons 81. The annular interspace between these pipes affords a passage 81a for the supply of heating or cooling fluid, as desired, to the interiors of rolls 1 and 3.

As shown in FIG. 14A, the inboard ends of pipes 81 are threaded into central holes in the left-hand covers, whereas the outboard ends extend through shafts 1b and 3b, respectively, to individual exterior flanges 82, which latter are bolt-secured to the flanges of commercial rotary joints 83. Rotation of these flanges and of the pipes 81 with respect to their associated rolls is prevented by engaging the ends of flange bolts 88 with threaded holes in the auxiliary flanges 89, which latter is fixedly secured to the ends of shafts 1b and 3b. Similarly, the bodies of the rotary joints 83 are anchored against rotation by bolt attachment to the outboard ends of stationary beams 84 joined to the respective pillow blocks 79 and 80 so as to be freely movable vertically therewith.

Pipes 81 are thermally insulated externally by sleeves 1c and 3c, respectively, and pipes 85 connect at their outboard ends with the stationary body of individual rotary joints 83 (not detailed), whence communication is had with suitable condensate traps and drains. As shown in FIG. 12, the temperature maintenance medium is introduced to the rolls 1 and 3 via flexible inlet connections 86 and exhausted therefrom via flexible outlet connections 87.

Referring to FIGS. 13, 14A and 14B, the upper roll 1 is roofed over a channel-like member 91 having slightly spread, downwardly depending legs 91a which enclose the upper third of the roll in close adjacency without, however, physically contacting the roll periphery. Channel 91 is supported at either end by downwardly inclined arms 92 welded thereto, the outer ends of arms 92 being removably attached to the pillow blocks 79.

Mounted on the outsides of legs 91a are hinges 93 to which are secured thin, non-ferromagnetic (e.g., stainless steel) sheet metal guides 94, which extend throughout the entire length of roll 1. The first portions of guides 94 disposed just below the ends of legs 91a are planar and hang vertically downwards on either side of roll 1. The end portions of the guides then curve inwardly and terminate in partially enclosing relationship with respect to roll 1 with tips exactly aligned with the nip formed by rolls 1 and 3, thereby forming a complete web guiding course for a web 20' shown as, typically, entering the apparatus from the right side, passing over guide roller 75, down over right-hand guide 94, through the roll nip, up over left-hand guide 94, thence over guide roller 74 and away to wind-up or other destination, not shown.

It will be understood that, when roll 1 is lifted to the upper ends of slots 65 by actuation of hydraulic lifts 71, the roll, together with channel 91 and guides 94 will all rise together as a unitary assembly, whereupon guides 94 will lie clear of guide rollers 74 and 75 and can be manually swung approximately 180° about their hinges 93, thus exposing roll 1 to view for inspection and any requisite repairs.

As best seen in FIG. 13, the two ferromagnetic (e.g., cast steel) flux guides, generally denoted at 96, are C-shaped, with the open sides of the C's facing the rolls in symmetrical orientation with respect to the horizontal diameters of rolls 1 and 3. Flux guides 96 extend parallel to the full lengths of rolls 1 and 3 and are supported by equal length ferromagnetic backing plates 97, bolt-attached to the vertical plates 99 of the flux guides, which are cradled in four generally C-shaped webs 98 fabricated from non-ferromagnetic material, which are welded to the horizontal channel 61.

Projecting horizontally from the plate 99 are upper and lower pole pieces 100 and 101, respectively, which extend radially toward rolls 1 and 3, full length thereof. At the free ends pole pieces 100 and 101 carry enlarged pole faces 95 of full roll length, fastened to the pole pieces by machine screws, not shown. The pole pieces serve as individual cores for electrical coils 102, which are connected in a manner such that, in electrical circuit, they are additive in overall magnetic attractive effect.

In a typical apparatus, the following dimensional plan was adhered to:

Rolls 1 and 3 measured—13.65" dia. x 66" long.
Thickness vertical plate 99—2.5".
Thickness pole pieces 100, 101—2.0".
Dimensions of pole faces 95—1.25" thick x 4.5" wide.
Spacing of pole faces 95 from roll 1—0.38".
Spacing of pole faces 95 from roll 3—0.25".
Electrical coils 102, each 105 turns of solid copper wire, 0.365" square, insulated with a double layer of glass fiber insulation.
Coil 102 characteristics: to carry 200 amps. D-C (at 120 v.) continuously at maximum temperature of 180° C.

The greater spacing of the pole faces with respect to upper roll 1, as compared to roll 3, was, of course, to provide ample clearance for web throughput in this region.

A useful modification of the embodiment shown in FIGS. 11–18 involves application and control of current to the coils 102, in a manner well known to those skilled in the art, such that an additive repulsing effect is created between the rolls when desired. This effect is useful where it is desired to vary the pressure applied to the web being treated, even to the point of releasing entirely any pressure caused by the upper roll.

An alternate electrical coil design employs hollow or tubular copper conduit 0.357" square (0.396" with insulation), provided with a 0.25" dia. central hole. Each coil 102 utilizes 108 turns of the hollow conductor, continuous electrically but divided into three sections by severing the conductor and joining the ends to a pair of manifolds for parallel supply and removal, respectively, of an appropriate cooling fluid.

Figure 18:
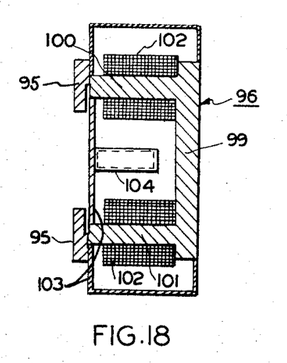
FIG. 18 is a sectional view taken on line 18—18, FIG. 15.

Since considerable heat energy can be liberated in the apparatus, provision is further had for forced air cooling of coils 102 as taught with reference to FIGS. 15–18, inclusive. A non-ferromagnetic sheet metal ventilation housing 103 encloses each coil and flux guide assembly on three sides, as seen in FIG. 18, except that tight-fitting openings are provided at the terminal ends of pole pieces 100 and 101, which protrude outwardly at these points, providing accessible ends for attachment of the pole faces 95, which are, thus, not magnetically affected by the ventilation housing. The housing is readily secured to the flux guide by machine screw attachment. Centrally of housing 103, within the interspace between pole pieces 100 and 101 and running nearly the entire length of housing 103, is a rectangular closed-off duct 104, which is provided to reduce the dead volume within flux guides 96 and also to divide the flow of cooling air approximately equally over both the upper and lower coils.

Figures 15, 17:
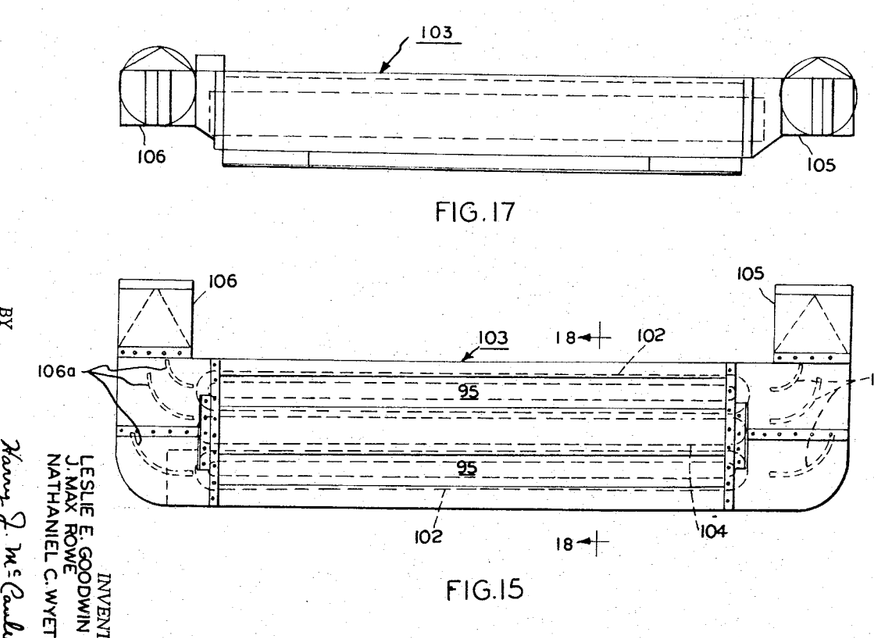
FIG. 15 is a front elevational view of a cooling duct for the apparatus of FIGS. 11–14, inclusive, shown in assembled position with respect to its associated flux guide.
FIG. 17 is a plan view of the duct of FIGS. 15 and 16.
Figure 16:
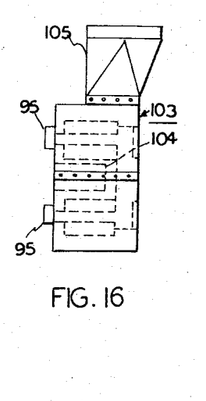
FIG. 16 is an end elevation view of the duct of FIG. 15.

Referring to FIG. 15, ventilation housing 103 is provided at each end with plenum chambers opening into air inlet and outlet ducts 105 and 106, respectively. Curved vanes 105a and 106a within the plenum chambers divert the air course smoothly through the 90° bends at opposite ends of housing 103. Inlet duct 105 is connected by suitable conduits, not shown, to a blower which forces air at a rate of, typically, 7000 s.c.f.m. through each ventilation housing 103 (or 14,000 s.c.f.m. total), thereby sweeping cooling air lengthwise across the exposed surfaces of coils 102 and the inner surface of flux guides 96.

Turning back to FIG. 13, the lower periphery of roll 3 is shielded full length by non-ferromagnetic pan sections 108, mounted between all of the vertical webs 98, which pans conform to the roll periphery but are out of contact therewith. Pans 108 are symmetrical about the vertical plane through the axes of rolls 1 and 3, each being hingedly mounted at the plane. Also, at their outer edges, pans 108 abut the lower edges of pole faces 95 on the lower pole pieces 101. Suitable catches, not detailed, prevent the pans from swinging downward, but permit opening them at will for inspection or cleaning of roll 3. Pans 108 serve to minimize convection drafts through the apparatus and also safeguard against tramp metal being drawn into the equipment by the magnetic fields carried therein.

Prior to operation of the machine for making product, rolls 1 and 3 are power-rotated and steam at a pressure of about 125 p.s.i., gage, is admitted, where, as usual, the product to be manufactured requires heat application. After machine warm-up, the web-form material to be treated is manually drawn to the machine from a supply source, such as, typically, a web-unwind stand, and hydraulic lifts 71 actuated to raise the entire roll assembly, inclusive of guides 94, to the upper ends of slots 65, thereby opening a straight clearance above guide rollers 74 and 75. All of the rolls can now be stopped momentarily, if desired, by de-energizing the drive, whereupon the web is passed over the tops of guide rollers 74 and 75. With web string-up completed, the operator re-energizes the drive to rotate rolls 1 and 3. The period of non-rotation is preferably kept at a minimum in the interests of maintaining uniform roll temperature, any condensate puddles accumulating in the bottoms of the rolls tending to prevent proper heating of the lower portions of the rolls, resulting in undesired temperature gradients and even, if severe, roll bowing.

The action of hydraulic lifts 71 is now reversed by operation of conventional four-way valves, which act to urge rods 70 downward, thereby carrying the assembly of roll 1 back down along slots 65 toward roll 3. The rate of roll descent is controlled by throttling devices, not shown, in the outlet lines leading from the rod ends of both the cylinders to the hydraulic fluid reservoir. As roll 1 and its guides 94 descend, the latter impinge upon the web-form process material and draw a loop of it into the machine until the terminal roll-to-roll clearance defining the nip is reached. at which point pressure is applied to the web in process. When a preselected nip clearance of, typically, 0.06″ is attained, as detected by limit switches, not shown, at both ends of the rolls, direct current power is automatically supplied to all of the coils 102, but only at a level of a few amperes (e.g., about 12 amps.). The operator thereafter manually increases the current supply to any preselected level up to about 200 amps. maximum. Alternatively, automatic controls can be provided to restore the current to any preselected level at a preselected delayed rate upon closure of the limit switches. The continuously running web-form material is now concurrently compressed and heat-treated while passing through the apparatus.

It will be understood that if the machine was running with the coils energized when the upper roll 1 and its appurtenances was elevated, the opening of the above-mentioned limit switches in consequence of lifting the roll will de-energize the coils gradually by decreasing the coil current at a controlled rate through circuitry not detailed, for example, at a rate of about 100 amperes per minute, to zero current. There is thereby obtained an orderly dissipation of the magnetic field.

If it is desired to carry out maintenance work, or change the rolls 1 or 3, this can be done very readily by disconnecting the drive couplings, removing the fasteners from the brackets 72, removing the pins 73 from the ends of rods 70, temporarily moving cylinders 71 aside, clear of slots 65, and finally lifting the entire roll assembly, including bearings, pillow blocks, half-coupling and rotary joint clear of the machine by a suitable hoist, not shown. If a standby roll assembly, equipped identically, has previously been made ready, the machine can be reassembled in a very short period of time, with a corresponding small loss of production.

The roll surfaces can, of course, be indented or patterned freely in accordance with the practices of the embossing or printing arts, and can also be surface-treated to confer wear resistance as, for example, by nitriding, although treatments such as this, which increase the magnetic reluctance, must, of course, be utilized with restraint.

Figures 19A, 19B:
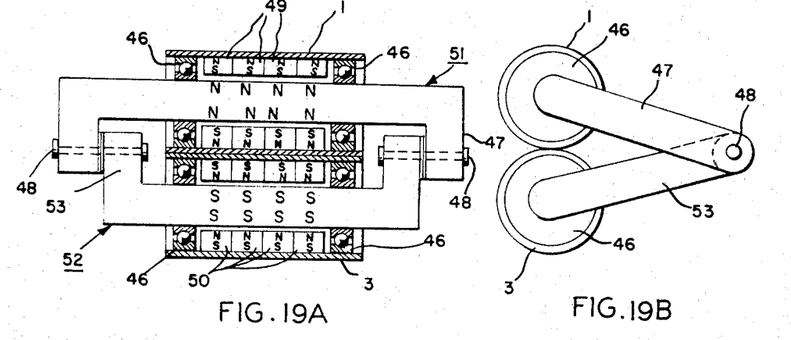
FIG. 19A is a longitudinal side elevational sectional view with pedestal supports omitted, of a ninth embodiment of apparatus according to this invention wherein a two roll set is utilized and the magnetic biasing is achieved by use of permanent magnets.
FIG. 19B is an end elevational view of the entire apparatus of FIG. 19A.

Magnetic biasing according to this invention can also utilize permanent magnets, as shown in FIGS. 19A and 19B. In these two figures, pedestal supports are omitted in the interests of simplification of the showings.

Referring to FIGS. 19A and 19B, ferrogmagnetic rolls 1 and 3 are here shown to be hollow and mounted in tangential contact, with axes in a common vertical plane, by journaling the ends on non-ferrogmagnetic ball bearings 46, the inner faces of which are fixed to U-shaped, circular cross-section ferromagnetic flux guides 52 and 51, the ends of the cross-pieces of which extend beyond the ends of the rolls. The legs 47, 53 of the flux guides extend backwardly from the rolls and are pivotally joined at their free ends by means of a pair of axially aligned hinge pins 48, which can, if desired, be provided with anti-friction bearings to accommodate both radial and thrust loads, thereby eliminating undesirable friction at these points. As seen in FIG. 19A, the flux guide legs lie in close adjacency in the regions of hinge pins 48.

Disposed within the rolls, in tight abutment against the inside peripheries thereof, are a multiplicity of toroidal type permanent magnets 49, 50 having their inner peripheries clear of the flux guides by a small amount (e.g., 0.005″), while the end faces of the magnets abut one another. Each of these permanent magnets is manufactured with its entire outer cylindrical surface of like given polarity, in this instance represented as N for magnets 49 and S for magnets 50, whereas the entire inner cylindrical surfaces have, of course, the opposite polarities.

Under the circumstances, rolls 1 and 3 will be magnetically attracted to each other and the cross pieces of flux guides 52 and 51 will be polarized as shown, completing the magnetic circuit for the apparatus through legs 47 and 53, respectively. It is important that the flux guides be large enough to avoid magnetic saturation and, also, that bearings 46 are made non-ferrogmagnetic to eliminate any magnetic shunting through these members.

Figure 20:
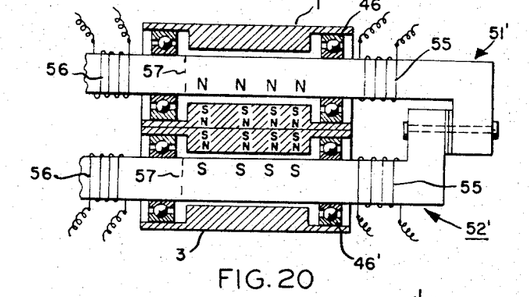
FIG. 20 is a longitudinal side elevational sectional view, with pedestal supports omitted, of a tenth embodiment of apparatus according to this invention wherein a two roll set is utilized together with permanent magnets in association with electrical coils for the roll-to-roll biasing.

Referring to FIG. 20, the design of the apparatus inclusive of rolls 1 and 3, and their associated flux guides is practically identical with that of FIGS. 19A and 19B. However, the cross-pieces of the flux guides are made somewhat longer than in the FIGS. 19A–19B embodiment in order to accommodate electrical coils 55 and 56, wound on the flux guides as cores. Coils 55 and 56 wound on each individual flux guide are connected in magnetically opposing relationship to a D–C source, not shown, so that the cross-pieces within a given roll have a like polarity throughout their entire spans, coil-to-coil. The coil pairs of individual flux guides are, of course, connected so as to produce opposite polarities in the two cross-pieces upon which rolls 1 and 3 are journaled through non-ferromagnetic bearing 46′.

Rolls 1 and 3 here are shown as very thick-walled hollow cylinders with inner peripheries closely adjacent (e.g., 0.005″ clear of) their associated cross-pieces which latter are, of course, part of the flux guides; typically, the portions of the rolls at and near the nip acquire inner and outer polarities as shown after magnetization when coils 55 and 56 are energized.

In a variation of the design of FIG. 20 a single coil can be employed on each flux guide 51′, 52′, provided that the portions of the flux guides to the left of dashed lines 57 are completely removed, leaving no ferromagnetic path capable of conducting flux to the left of these lines. If structural support is needed at the left-hand ends, non-ferromagnetic structures can be substituted.

Figure 25A:
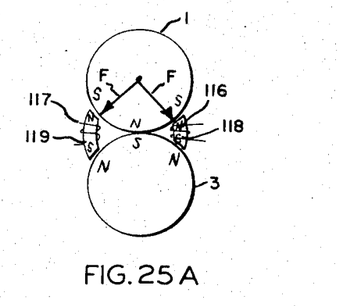
FIG. 25A is a schematic end view, with pedestal supports omitted, of an eleventh embodiment of apparatus according to this invention wherein short flux guides of arcuate shape carrying coils wound thereon provide the ferromagnetic flux return path between the two rolls of the pressure-applying set.

The embodiment of invention detailed in FIG. 25A, from which the pedestal supports and other auxiliary equipment have been omitted for simplicity in the showing, is somewhat similar to that of FIGS. 7–10, except that the electromagnets, consisting of coils 116 and 117 wound on full roll length flux guide 118 and 119, respectively, as cores, are disposed partially within the nip of rolls 1 and 3. The ends of the flux guides are shaped arcuately to conform to the roll curvatures and are in close adjacency to the rolls, but out of contact therewith. The respective ends or poles of the flux guides can clear the rolls by different amounts to allow for ready passage of the web in process therepast. The flux guide coils are connected to a D-C source giving a magnetization typically as represented.

The advantage of this design is that rolls 1 and 3 will not only be attracted to each other by the flux passing across the nip but also will be attracted via the flux guides, which latter develop forces denoted by vectors F, the vertical components of which are additive to the nip attraction. Thus, assuming that vectors F are situated at angles of 45° from the common plane of the roll axes.

the total force urging the rolls together would be about 40% greater than in the embodiment of FIG. 8 for the same general size of components and the same coil ampere-turns.

Figures 21, 22, 23, 24, 25B, 26:
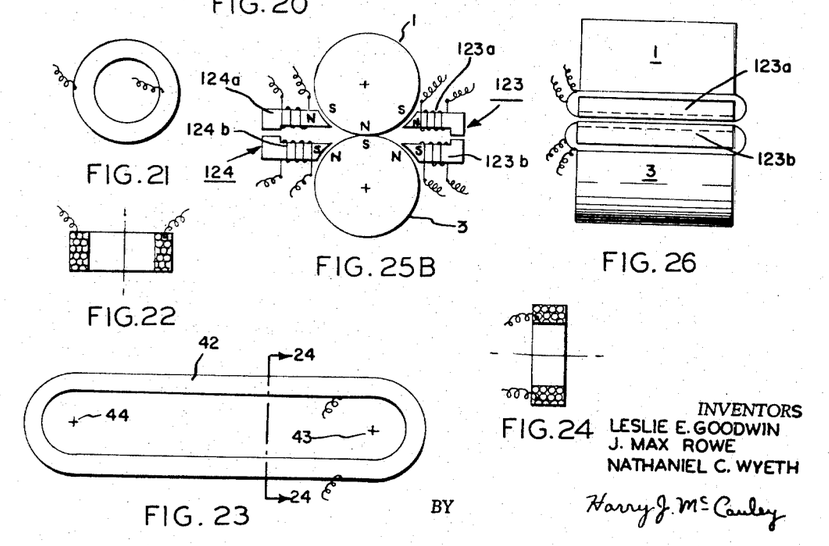
FIG. 21 is a schematic representation of a circular form electrical coil.
FIG. 22 is a diametrical section view of the coil of FIG. 21.
FIG. 23 is a schematic representation of an elongated form electrical coil.
FIG. 24 is a section taken on line 24—24, FIG. 23.
FIG. 25B is a schematic end view of a variation of the design of FIG. 25A, utilizing straight form ferromagnetic flux guides.
FIG. 26 is a side-elevational view of the apparatus of FIG. 25B.

FIGS. 25B and 26 show a variation of the design of FIG. 25A, modified to permit straight-through feed of the web in process. Here the flux guides 123 and 124 are split horizontally through the short cross-pieces of the U shapes, leaving horizontally disposed pole pairs 123a, 123b and 124a, 124b on opposite sides of the roll partially disposed within the nip. Again, the pole ends are curved arcuately to conform to the roll peripheries. The four coils are connected to a D-C source to give a magnetization pattern such as the typical one portrayed.

In each of the embodiments of FIGS. 25A and 25B–26, permanent magnets can be substituted for electromagnets if desired.

Where permanent magnets are utilized, means can be added for controlling the roll 1-to-roll 3 attractive force, such as mechanical means for adjusting the positions of the permanent magnets toward or away from the roll nip. A suitable servomechanism responsive to a web thickness-measuring or other sensing device could accomplish this function automatically and, of course, similar means could regulate coil current in the embodiments of this invention which utilize coils.

Figures 27A, 27B:
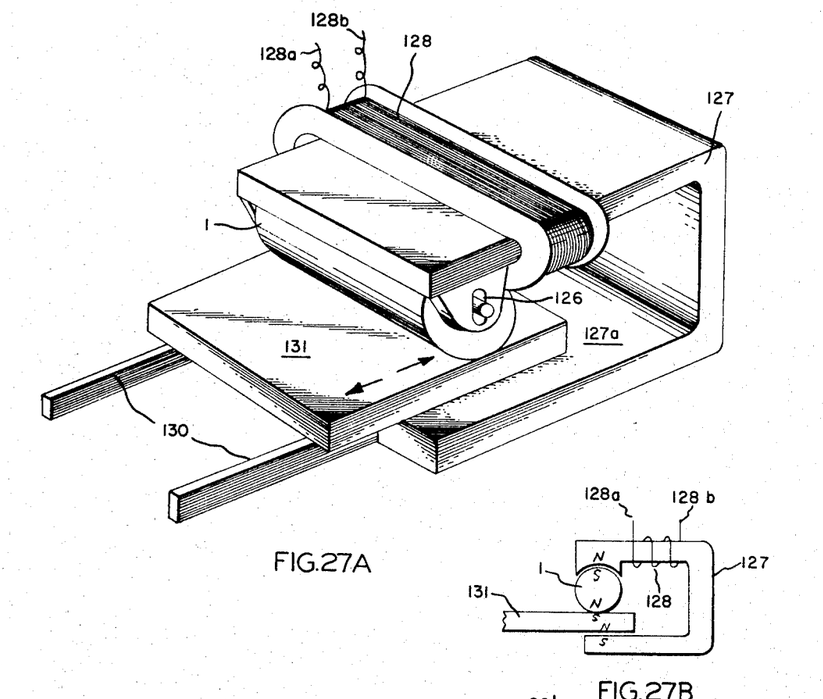
FIG. 27A is a perspective view of a twelfth embodiment of apparatus according to this invention utilizing a single roll as one of the pair of associated pressure applicators and a reciprocatory platen as the other.
FIG. 27B is a schematic side elevational view of the apparatus of FIG. 27A.

While the foregoing embodiments are directed exclusively to roll form pressure applicators, this invention is by no means so limited, and FIGS. 27A and 27B teach schematically a design of apparatus utilizing a planar form pressure applicator operating in conjunction with a single roll. Such an apparatus is particularly useful in the embossing, printing or pressing of single sheets of material, which can be fed in on each operating stroke and then stripped off on the return.

Thus, pressure applicator 1 comprises a ferromagnetic cylindrical roll journaled at its ends in downwardly directed retaining slots 126 extending from the underside of a horseshoe-shaped ferromagnetic flux guide 127 on which is wound, as core, electrical coil 128 provided with leads 128a and 128b running to a D-C power source. Coplanar with the lower inside surface 127a of the flux guide is attached a pair of ways 130 which, together with the machined surface 127a, constitute support guides over which the platen 131, constituting the second pressure applicator of the pair, reciprocably travels. Platen 131 can be driven by a conventional rack-and-pinion gear set (not detailed), or in other usual manner.

Figures 28A, 28B:
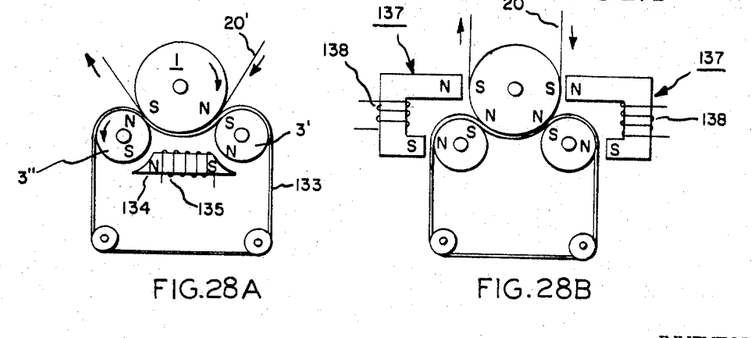
FIG. 28A is a schematic end elevational view, with pedestal supports omitted, of a thirteenth embodiment of apparatus according to this invention utilizing a sequentially-acting triple roll set through which is threaded an endless product support belt.
FIG. 28B is a schematic end elevational view of a variation of the apparatus of FIG. 28A provided with electrical coils wound on flux guides, each serving opposite sides of the apparatus.

It is sometimes desirable to produce a prolonged pressure application to the running web, and this is readily achieved with the embodiment of FIGS. 28A and 28B.

Here three-roll sets of spaced pairs of pressure applicators are utilized, an endless belt 133 being threaded between the sequential nips afforded. Thus, roll 1 bears on rolls 3′ and 3″ spaced apart one from another approximately 90″ as measured from the longitudinal axis of roll 1 as reference. Web 20′ can typically enter from the right and leave to the left as seen in FIG. 28A and, during a full 90° of circumferential travel with respect to roll 1, is subjected to pressure application.

Either single flux guides, internally mounted as shown in FIG. 28A, or external paired flux guides as shown in FIG. 28B, can be conveniently employed, that of FIG. 28A comprising a straight ferromagnetic core 134 upon which is wound as core electrical coil 135, the pole faces of the flux guide being curved to conform to the peripheries of rolls 3′ and 3″.

The flux guides 137 of FIG. 28B comprise ferromagnetic channel forms upon which are wound as cores electrical coils 138 connected in circuit with a D-C source to produce additive magnetic attractions across the two roll pairs. Typical operative polarities for both of the embodiments are denoted in N, S convention in FIGS. 28A and 28B.

It will be noted that the flux guides of FIG. 28B restrict web 20′ feed in and removal from the top; however, pressure application over a full 90° of running web travel is still obtained.

Figure 29A:
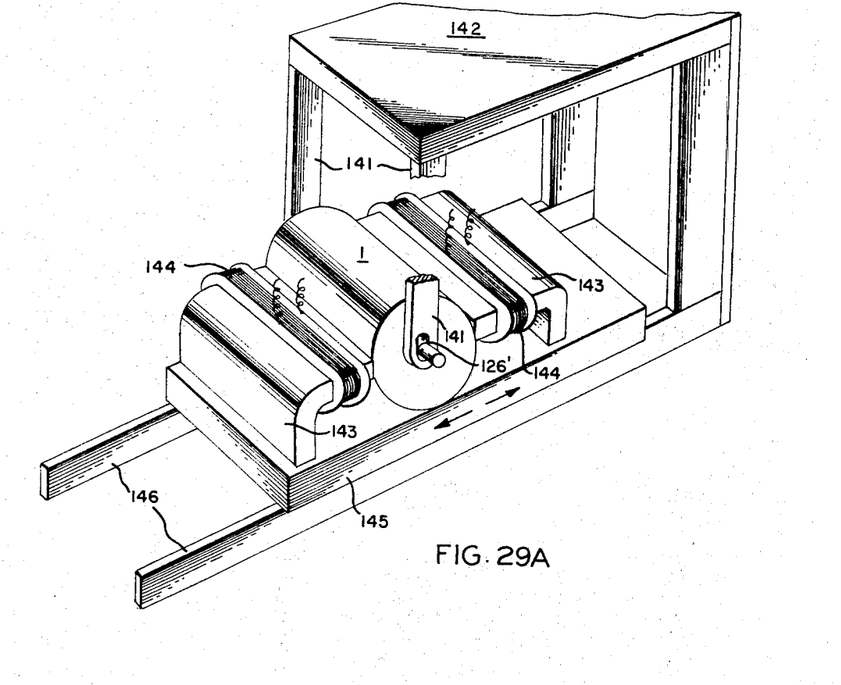
FIG. 29A is a perspective view of a preferred embodiment of apparatus according to this invention utilizing a single roll as one of the pair of associated pressure applicators and a reciprocatory platen as the other.
Figure 29B:
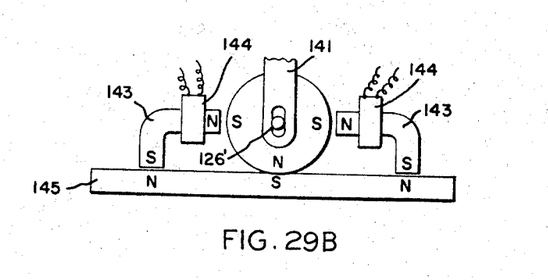
FIG. 29B is a schematic side elevational view of the apparatus of FIG. 29A.

A preferred embodiment of reciprocatory platen apparatus is that shown in FIGS. 29A and 29B wherein roll 1 is journaled in slots 126′ cut in vertical supports 141, constituting part of the stationary machine framework denoted generally at 142. Framework 142 also supports curved ferromagnetic flux guides 143 upon which, as cores, are wound coils 144. The undersides of flux guides 143 clear reciprocating platen 145 by a small distance, which platen travels on ways 146 over which it is driven by a rack-and-pinion, crank or other conventional device not shown. Typical polarities with coils 144 energized are as shown in FIG. 29B. The design of the flux guide is symmetrical, thereby effectively canceling transverse magnetic forces.

Numerous modifications of the embodiment described are practicable and often desirable, depending upon particular applications. Thus, either or both of the pressure applicators can be provided over the outer peripheries with elastomeric or other non-ferromagnetic covering, although there is then a corresponding reduction in the roll-to-roll attractive force as a result of the increased gaps in the magnetic circuit.

Web-contacting rolls 1 and 3 can have a wide variety of surface patterns, such as, by way of example solely, serrated, toothed, grooved, "waffle iron," "orange peel" and many others.

Pressure application control can be accomplished by utilization of a suitable sensing device or transducer adopted to measure roll spacing, finished web thickness, web density, web surface characteristics or some other significant parameter, and the measured quantity can then be used in the automatic control of current to the biasing coils, thereby controlling the roll-to-roll loading within desired limits.

Web guides in the form of non-ferromagnetic plates, chutes or rollers can be added as required.

The following general considerations apply to the design of apparatus according to this invention:

(1) The practical upper limit of attractive force between pressure applicators is approached when the ferromagnetic flux path approaches magnetic saturation; higher levels may be attained by substituting a material of fabrication having a higher magnetic saturation, or by increasing the cross section of the narrow portions of the magnetic flux path where possible.

(2) Roll-to-roll loadings of the order of 500–600 lbs./ lineal inch of roll length are attainable at roll-to-roll spacings of 0.010″ or less. Greater roll spacings can be tolerated where lower magnetic loadings are practicable but, generally, roll spacings should be kept below about 0.3″ maximum.

(3) Run-out, i.e., eccentricity of rolls, should be avoided in order to prevent cyclic variations in roll-to-roll attractive force. The degree of run-out that is permissible is a function of the summation of the air gaps in a given magnetic circuit, including the roll-to-roll gap. The larger the sum of the gaps, the larger the permissible run-out; however, it is preferred to keep this below about 0.03″, i.e., 0.015″ eccentricity.

(4) In any apparatus employing flux guides, the rolls should be disposed symmetrically between the confronting faces of the flux guides; that is the gap on one side of a roll should generally not greatly exceed the gap on the other side of the roll, because, otherwise, excessive transverse deforming forces could then be applied to the rolls as a result of unbalanced magnetic force application.

(5) Where flux guides are utilized, the number and size of the gaps in the flux path should be kept to a minimum in the interest of obtaining the greatest possible roll-to-roll attractive force for a given number of ampere-turns in the coils. Generally, the roll-to-flux guide spacing should be of the order of 0.030″ to 0.250″, an exception being where relatively long, slender easily deformed rolls are used, in which case the roll-to-flux guide gap should be large enough so that a transient mechanical deflection of the roll in a transverse direction will not result in an unbalanced magnetic force capable of deforming the roll against the flux guide, where it would remain until the magnetizing coil is deenergized.

(6) In designs in which the coils do not surround the pressure applicators but encircle parts of the flux guides as cores, the coils on opposite sides of the apparatus should have approximately equal numbers of ampereturns, i.e. within ±1%.

(7) In general, the rolls of the apparatuses should not be rotated at such high speeds that more heat is generated, due to induced eddy currents, than it is possible to dissipate without excessive temperature rise. This usually limits the drive speed unless forced cooling is resorted to.

From the foregoing, it will be understood that this invention can be modified extensively within the skill of the art without departure from its essential spirit, and it is, accordingly, intended to be limited only within the scope of the appended claims.

What is claimed is:

1. A magnetically-biased, pressure-applying apparatus for handling running length materials comprising, in combination, a pair of ferromagnetic pressure applicators, at least one of which is a roll provided with a coaxial shaft journaled at the ends to permit rotation about its longitudinal axis, defining between them a material-receiving nip generally co-planar with the longitudinal axis of said roll, said applicators being mounted for free movement with respect to one another in a direction varying the opening of said nip, and means incorporating ferromagnetic flux guides coextensive with and in spaced relationship with respect to said applicators developing a substantially uniform magnetic flux density through said applicators in the plane inclusive of said longitudinal axis and said nip urging said applicators together.

2. A magnetically-biased, pressure-applying apparatus for running length materials according to claim 1 wherein said means developing said substantially uniform magnetic flux density through said applicators comprises a D-C source connected in circuit with an electrically insulated conductor coil disposed with coil axes lying in a plane substantially coincident with said plane inclusive of said longitudinal axis and said nip.

3. A magnetically-biased, pressure-applying apparatus for running length materials comprising, in combination, a pair of cylindrical rolls each provided with a coaxial shaft journaled at the ends to permit rotation around their respective longitudinal axes disposed with said longitudinal axes parallel and defining therebetween a material-receiving nip, said rolls being mounted for free movement with respect to one another in a direction varying the opening of said nip, and means incorporating ferromagnetic flux guides coextensive with and in spaced relationship with respect to said applicators developing a substantially uniform magnetic flux density through said rolls in the plane inclusive of said longitudinal axes of said rolls urging said rolls together.

4. A magnetically-biased, pressure-applying apparatus for running length material according to claim 3 wherein said means developing substantially uniform magnetic flux density through said rolls comprise a D-C source in circuit with individual electrically insulated conductor coils disposed symmetrically with respect to individual ones of said pair of cylindrical rolls.

5. A method of loading a roll set having a pair of ferromagnetic pressure applicators, at least one of which is a roll provided with a coaxial shaft journaled at the ends to permit rotation about its longitudinal axis, defining between them a material-receiving nip generally coplanar with said longitudinal axis of said roll, said applicators being mounted for free movement with respect to one another in a direction varying the opening of said nip, comprising developing a substantially uniform magnetic flux density through said applicators in the plane of said longitudinal axis and said nip to bias said applicators toward one another, and maintaining said magnetic flux density at a level producing a substantially uniform loading throughout the full length of said nip.

6. A magnetically-biased, pressure-applying apparatus for running length materials comprising, in combination, a pair of ferromagnetic pressure applicators, at least one of which is a roll provided with a coaxial shaft journaled at the ends to permit rotation about its longitudinal axis, defining between them a material-receiving nip generally co-planar with the longitudinal axis of said roll, said applicators benig mounted for free movement with respect to one another in a direction varying the opening of said nip, and means inclusive of permanent magnets provided with associated ferromagnetic flux guides coextensive with and in spaced relationship with respect to said applicators developing a substantially uniform magnetic flux density through said applicators in the plane inclusive of said longitudinal axis and said nip urging said applicators together.

7. A magnetically-biased, pressure-applying apparatus for running length materials comprising, in combination, a central cylindrical roll provided with a coaxial shaft journaled at the ends to permit rotation about its longitudinal axis and a plurality of secondary cylindrical rolls disposed peripherally of said central cylindrical roll and spaced angularly one from another referred to said longitudinal axis of said central roll as a polar axis of reference, said secondary rolls being each provided with a coaxial shaft journaled at the ends to permit rotation about their individual axes with freedom of movement radially with respect to said central roll, said individual axes being disposed co-parallel with said longitudinal axis of said central roll and said secondary rolls defining with said central roll material-receiving nips, a belt threaded through said nips adapted to support a web in transit through said apparatus, and means incorporating ferromagnetic flux guides coextensive with and spaced from said secondary rolls and said central roll developing a substantially uniform magnetic flux density through said central roll and said secondary rolls along the lengths of said nips urging said central roll and said secondary rolls together.

8. A magnetically-biased, pressure-applying apparatus for running length materials comprising, in combination, a pair of cylindrical rolls each provided with a coaxial shaft journaled at the ends to permit rotation around their respective longitudinal axes disposed with said longitudinal axes parallel and defining therebetween a material-receiving nip, said rolls being mounted for free movement with respect to one another in a direction varying the opening of said nip, ferromagnetic flux guide means coextensive with and in spaced relationship with respect to said rolls having pole faces in close proximity to the peripheries of said rolls of length approximately equal to the lengths of said rolls, individual electrically insulated conductor coils wound on said flux guide means as cores and a D-C source in circuit with said coils biasing said rolls together.

9. A magnetically-biased, pressure-applying apparatus for running length material according to claim 8 wherein said pole faces lie substantially within said nip between said cylindrical rolls.

10. A magnetically-biased, pressure-applying apparatus for running length material comprising, in combination, a pair of ferromagnetic applicators of which one is a roll provided with a coaxial shaft journaled at the ends to permit rotation about its longitudinal axis and the other is a planar platen defining with said roll a material-receiving nip generally co-planar with the longitudinal axis of said roll, said applicators being mounted for free movement with respect to one another in a direction varying the opening of said nip, and means incorporating ferromagnetic flux guides coextensive with and in spaced relationship with respect to said applicators developing a substantially uniform magnetic flux density through said applicators in the plane inclusive of said longitudinal axis and said nip urging said applicators together.

References Cited

UNITED STATES PATENTS 2,805,856  9/1957  Stuchbery.
2,995,363  8/1961  Pittwood __________ 271—57 X

FOREIGN PATENTS 716,229  9/1954  Great Britain.

OTHER REFERENCES

German printed application 1,166,523 (1964).

M. HENSON WOOD, JR., *Primary Examiner.*

R. A. SCHACHER, *Assistant Examiner.*